US006907674B2

(12) United States Patent
Grendahl

(10) Patent No.: US 6,907,674 B2
(45) Date of Patent: Jun. 21, 2005

(54) ELECTRICAL CONDUIT LAYOUT TEMPLATE

(76) Inventor: Mark S. Grendahl, 117 Belmont Rd., Apple Valley, MN (US) 55124

( * ) Notice: Subject to any disclaimer, the term of this patent is extended or adjusted under 35 U.S.C. 154(b) by 0 days.

(21) Appl. No.: 10/671,426

(22) Filed: Sep. 25, 2003

(65) Prior Publication Data

US 2004/0103550 A1 Jun. 3, 2004

Related U.S. Application Data

(63) Continuation-in-part of application No. 29/182,926, filed on Jun. 2, 2003, now abandoned, which is a continuation of application No. 29/161,790, filed on Jun. 5, 2002, now Pat. No. Des. 475,307.

(51) Int. Cl.[7] .................................................. G01B 3/14

(52) U.S. Cl. .............................. 33/566; 33/562; 33/613

(58) Field of Search .......................... 33/566, 562, 563, 33/613, 645, 520, 644, 494, 27.03, 27.031, 27.032

(56) References Cited

U.S. PATENT DOCUMENTS

| | | | | | |
|---|---|---|---|---|---|
| D142,608 | S | | 4/1945 | Ziegfeld | |
| D165,849 | S | | 2/1952 | Jordan | |
| D167,043 | S | | 3/1952 | Kintz | |
| 4,443,949 | A | * | 4/1984 | Newton | 33/613 |
| 4,584,780 | A | | 4/1986 | Pressey | |
| 4,670,990 | A | * | 6/1987 | Horvath | 33/562 |
| D347,586 | S | | 6/1994 | Kim | |
| 5,426,859 | A | * | 6/1995 | Concari et al. | 33/27.02 |
| 5,577,328 | A | | 11/1996 | Kerry, Sr. | |
| 5,666,737 | A | * | 9/1997 | Ryan, III | 33/562 |
| 5,685,816 | A | | 11/1997 | Romer | |
| 6,216,354 | B1 | | 4/2001 | Carbone | |
| D448,406 | S | | 9/2001 | Lariviera, Jr. et al. | |
| D448,802 | S | | 10/2001 | Lariviera, Jr. et al. | |
| 6,434,844 | B1 | | 8/2002 | Rank | |
| 6,658,746 | B2 | * | 12/2003 | Ganivet | 33/1 SB |

OTHER PUBLICATIONS

Website http://www.maxistools.com/product/marksman/, printed on Jan. 12, 2005.

Website http://www.maxistools.com/docs/Marksman%20Instruction%20Sheet.pdf, printed on Jan. 12, 2005.

Website http://www.maxistools.com/docs/Marksman_Literature.pdf, printed on Jan. 12, 2005.

* cited by examiner

*Primary Examiner*—Christopher W. Fulton
(74) *Attorney, Agent, or Firm*—Kinney & Lange, P.A.

(57) ABSTRACT

A template provides a quick and accurate method for marking locations of conduit entry holes to be formed in an electrical panelboard. The template is a rectangular sheet that is divided into longitudinal spacer zones, transverse spacer zones, a longitudinal marking zone and graduated marking zones. Each of the marking zones has multiple apertures used in making marks on the electrical panelboard to identify hole locations.

14 Claims, 3 Drawing Sheets

ELECTRICAL CONDUIT LAYOUT TEMPLATE

CROSS-REFERENCE TO RELATED APPLICATION(S)

This application is a continuation in part of application Ser. No. 29/182,926 filed on Jun. 2, 2003, now abandoned and entitled "Electrician Centerline Template", which is incorporated herein by reference and which is a continuation of application Ser. No. 29/161,790, filed on Jun. 5, 2002 and entitled "Electrician's Centerline Template" (now Design Pat. No. D475,307).

BACKGROUND OF THE INVENTION

The present invention relates generally to the field of stencils for use in the construction industry. In particular, the present invention relates to a template for laying out multiple entry holes for passage of conduit into an electrical panelboard.

In the construction industry, electrical wires are often run through piping to safely deliver power to and from a panelboard and then onto different areas of a building. This piping, referred to as "conduit" in the trade, is typically constructed from metal or plastic and comes in a variety of sizes standard to the electrical industry. The size of conduit used to run a particular electrical line depends both upon the length of the run as well as the particular power application.

Running conduit from a panelboard to distant areas of a building frequently requires an electrician to make numerous entry holes for passage of conduit both into and out of an electrical panelboard, as well as potentially through walls and ceilings. Often times multiple rows of columns of conduit must be installed, such as when wiring a panelboard. The configuration of the conduit is often maintained until the conduit branch off to reach different areas of a building. As such, an electrician may be required to make the same hole-cut pattern on, for example, the top surface of a panelboard and a ceiling suspended above.

Under the traditional method for laying out the positions of conduit entry holes on the top of a panelboard housing, an electrician uses a ruler or tape measure to measure the location of each particular entry hole. In doing so, the electrician must take into account the spacing of each conduit from a wall surface on which panelboard is located to allow for the thickness of the strut used to secure the conduit to the wall surface. In addition, the electrician must account for the spacing between each conduit, which typically conforms to industry standards such as those proscribed by the National Electrical Contractors Association (NECA).

The traditional method for laying out entry holes on a panelboard has several drawbacks. When multiple rows and/or columns of conduit are to be installed the task of marking the locations of the conduit entry holes can become a time consuming and tedious task. Although the electrician may need to replicate the same pattern of entry holes in multiple surfaces, each hole in each installation must be individually measured. In addition, under the traditional method, errors in measuring often occur, resulting in wasted labor and materials.

Measuring aids for speeding up the measurement process are known. U.S. Pat. No. 5,577,328 discloses a stencil with pre-measured markings to aid in the measuring process. The stencil is capable of measuring a variety of conduit entry hole sizes. However, an electrician using the stencil can lay out only one entry hole at a time, and must reposition the stencil before measuring an adjacent entry hole. In addition, the stencil does not account for the thickness of strut used to secure the conduit to a wall surface. Thus, the measuring process still requires a multitude of measurements and an opportunity for error exists when repositioning the template for each individual entry hole.

U.S. Pat. No. 4,584,780 also discloses a template for laying out conduit entry holes on an electrical panelboard. The template, however, must also be repositioned to measure each entry hole and does not account for the thickness of strut used to attach the conduit to a wall surface.

Given the limitations of the prior art, a more systematic measuring template and measuring method is needed to speed the accuracy and timing of conduit installations, especially for multiple-conduit installations.

BRIEF SUMMARY OF THE INVENTION

The invention is a template for laying out electrical conduit entry hole positions on an electrical panel housing. The template is made from a sheet having a longitudinal straight edge for engaging a wall surface on which the electrical panel is fixed. The template has a spacer zone bordered on one side by the longitudinal straight edge and extending the length of the template. The width of the spacer zone in the transverse direction corresponds to the thickness of a support means used to secure the electrical conduit to the wall surface. The template also includes a marking zone which extends parallel to the longitudinal straight edge and is spaced from the longitudinal straight edge by the spacer zone. The marking zone has a width in the transverse direction corresponding to an outside diameter of a given size of electrical conduit. A plurality of apertures formed in the sheet are centered on the marking zone. The plurality of apertures form a line parallel to the straight edge and are designed to receive a tool for marking the center locations of entry holes.

DETAILED DESCRIPTION

Figures 1, 2, 3, 4:
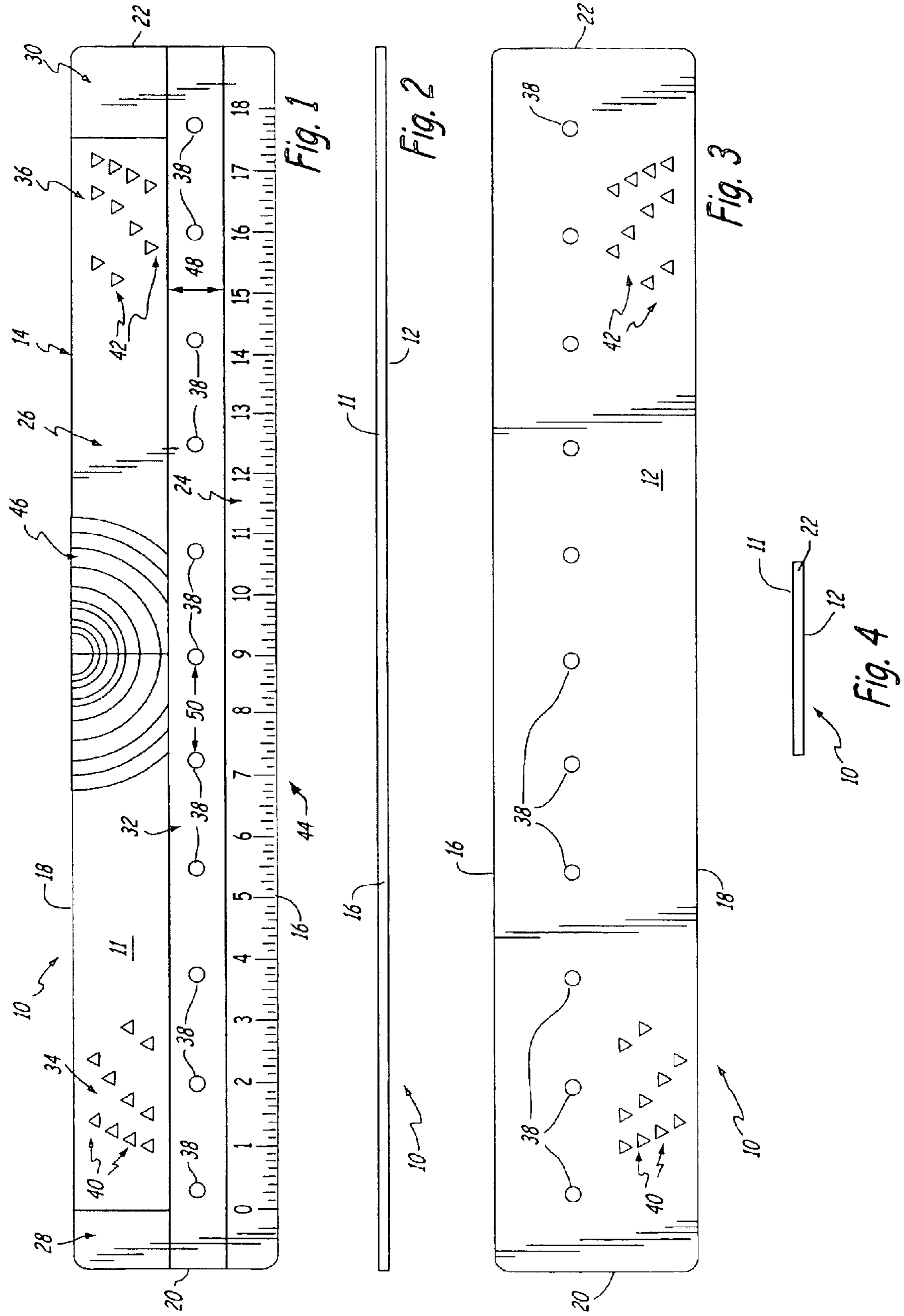
FIG. 1 is a top view of an electrical conduit layout template incorporating my new design.
FIG. 2 is a side view of the electrical conduit layout template of FIG. 1, the other side view being the same as that shown.
FIG. 3 is a bottom view of the electrical conduit layout template of FIG. 1.
FIG. 4 is an end view of the electrical conduit layout template of FIG. 1, the other end view being the same as that shown.

A rectangular electric conduit layout template 10 is shown in FIGS. 1–4, with FIG. 1 showing a top view of template 10, FIG. 2 showing a side view of template 10, FIG. 3 showing a bottom view of template 10, and FIG. 4 showing an end view of template 10.

Template 10 is typically formed from a single piece of rectangular sheet metal, although it can also be formed from other materials such as, for example, plastic. Template 10 has a top face 11 and a bottom face 12 and a rectangular perimeter 14 consisting of longitudinal straight edges 16 and 18 and transverse straight edges 20 and 22. Top face 11 is divided into various zones, some of which overlap. These zones include longitudinal spacer zones 24 and 26, transverse spacer zones 28 and 30, longitudinal marking zone 32, and graduated marking zones 34 and 36. Each of the marking zones 32, 34, and 36 have a plurality of marking apertures 38, 40, and 42, respectively, formed therein. Template 10 also has a ruler 44 and a conduit sizing scale 46.

Longitudinal straight edges 16 and 18 are parallel to one another and on opposing edges of template 10. Transverse straight edges 20 and 22 are parallel to on another and disposed on opposite ends of template 10. Moreover, longitudinal straight edges 16 and 18 are oriented perpendicular to transverse straight edges 20 and 22. Spacer zones extend along each of the straight edges 16, 18, 20, and 22. Longitudinal spacer zones 24 and 26 extend along each longitudinal straight edge and separate a longitudinal marking zone 32 from each of longitudinal straight edges 16 and 18. Longitudinal marking zone 32 has a width in the transverse direction corresponding to the outside diameter of a particular size of conduit. In addition, longitudinal marking zone 32 has a plurality of marking apertures 38 formed therein. Each of the plurality of marking apertures 38 is spaced from the adjacent marking aperture according to industry standards for conduit spacing.

Transverse spacer zones 28 and 30 extend along at least a portion of each transverse straight edges 20 and 22. Graduated marking zones 34 and 36 abut each transverse spacer zone 28 and 30. Each graduated marking zone 34 and 36 has a plurality of marking apertures 40 and 42 formed therein. Ruler 44 is preferably positioned along longitudinal straight edge 16 in longitudinal spacer zone 24. In addition, a conduit sizing scale 46 is included inside longitudinal spacer zone 26 along longitudinal straight edge 18. Ruler 44 and conduit sizing scale 46, and any other markings on faces 11 and 12 may be either stamped or inked onto the faces.

In the present embodiment, width 48 of longitudinal marking zone 32 corresponds to the outside diameter of ¾ inch conduit. It is contemplated that width 48 could be of a longer or shorter length depending upon the size of conduit longitudinal marking zone 32 is designed to be used for installing. The plurality of marking apertures 38 preferably extend in a line parallel to longitudinal straight edges 16 and 18 such and centered on longitudinal marking zone 32. Each aperture is preferably spaced a uniform distance 50 from the immediately adjacent apertures to conform to industry standards. The distance between each aperture will vary depending upon the size of conduit longitudinal marking zone 32 is designed to be used for installing. In the present embodiment the spacing between the centers of adjacent apertures is approximately an inch and three-quarters. It should be noted that although each aperture has a round profile in the present embodiment, the apertures may be of any shape capable of receiving a marking tool such as, for example, a writing utensil or scoring tool.

Longitudinal spacer zones 24 and 26 preferably have uniform widths in the transverse direction of approximately ¾ of an inch and 1½ inches, respectively. These widths correspond to the thickness of the struts or channels routinely used in the industry to secure electrical conduit to wall surfaces. Likewise, transverse spacer zones 28 and 30 also preferably have uniform widths in the longitudinal direction of approximately ¾ of an inch and 1½ inches, respectively, to correspond to the common strut or channel thicknesses.

Graduated marking zones 34 and 36 are preferably located on each transverse edge of the template immediately adjacent to the transverse spacer zones. The graduated marking zones contain a plurality of marking apertures formed in the template. Each aperture of the plurality of marking apertures 40 and 42 is spaced inward from the transverse spacer zones by a distance corresponding to the outside radius of a particular size of conduit.

Figure 5:
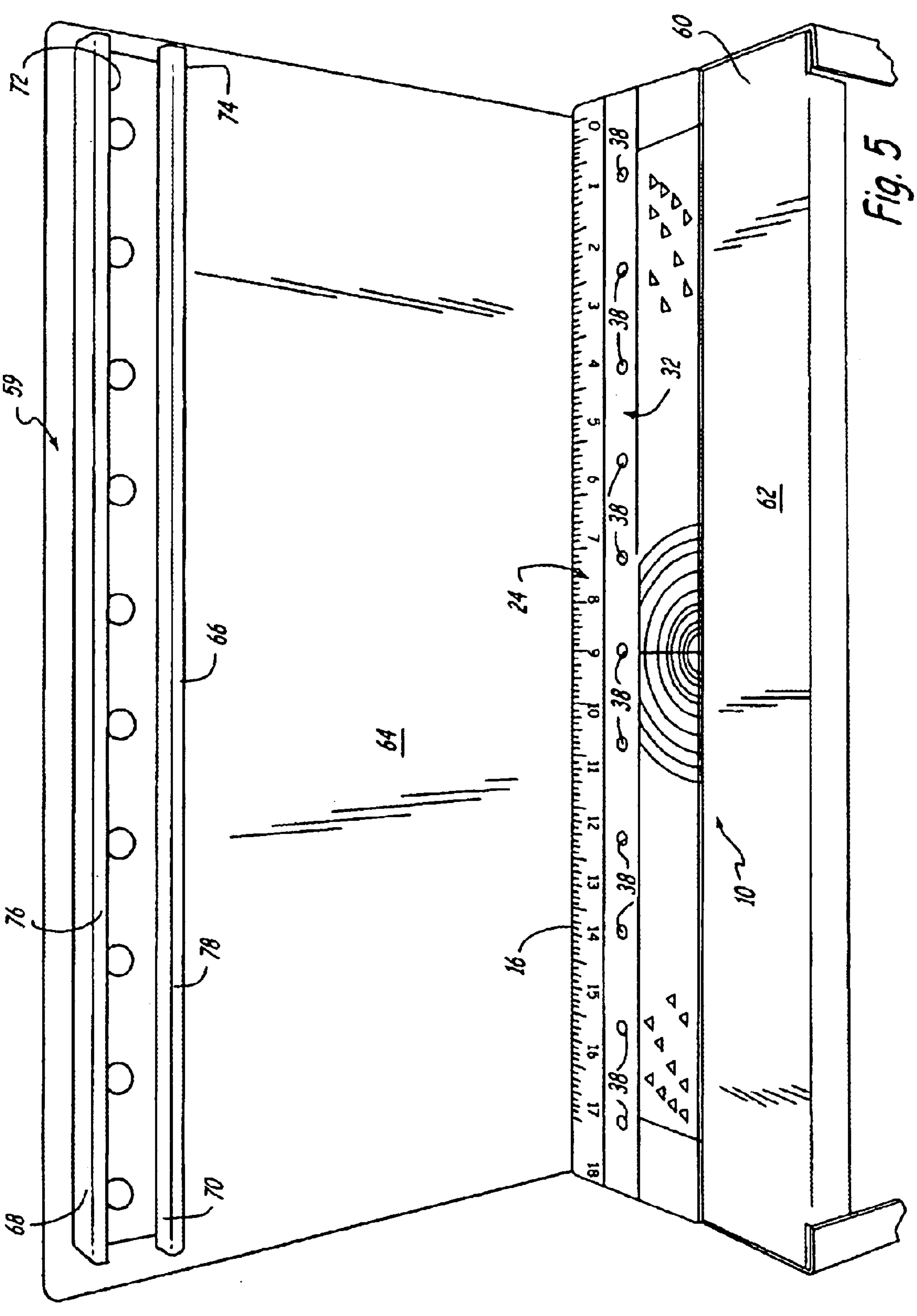
FIG. 5 is a perspective view of the electrical conduit layout template of FIG. 1 oriented longitudinally on the top of an electric panelboard installation.
Figure 6:
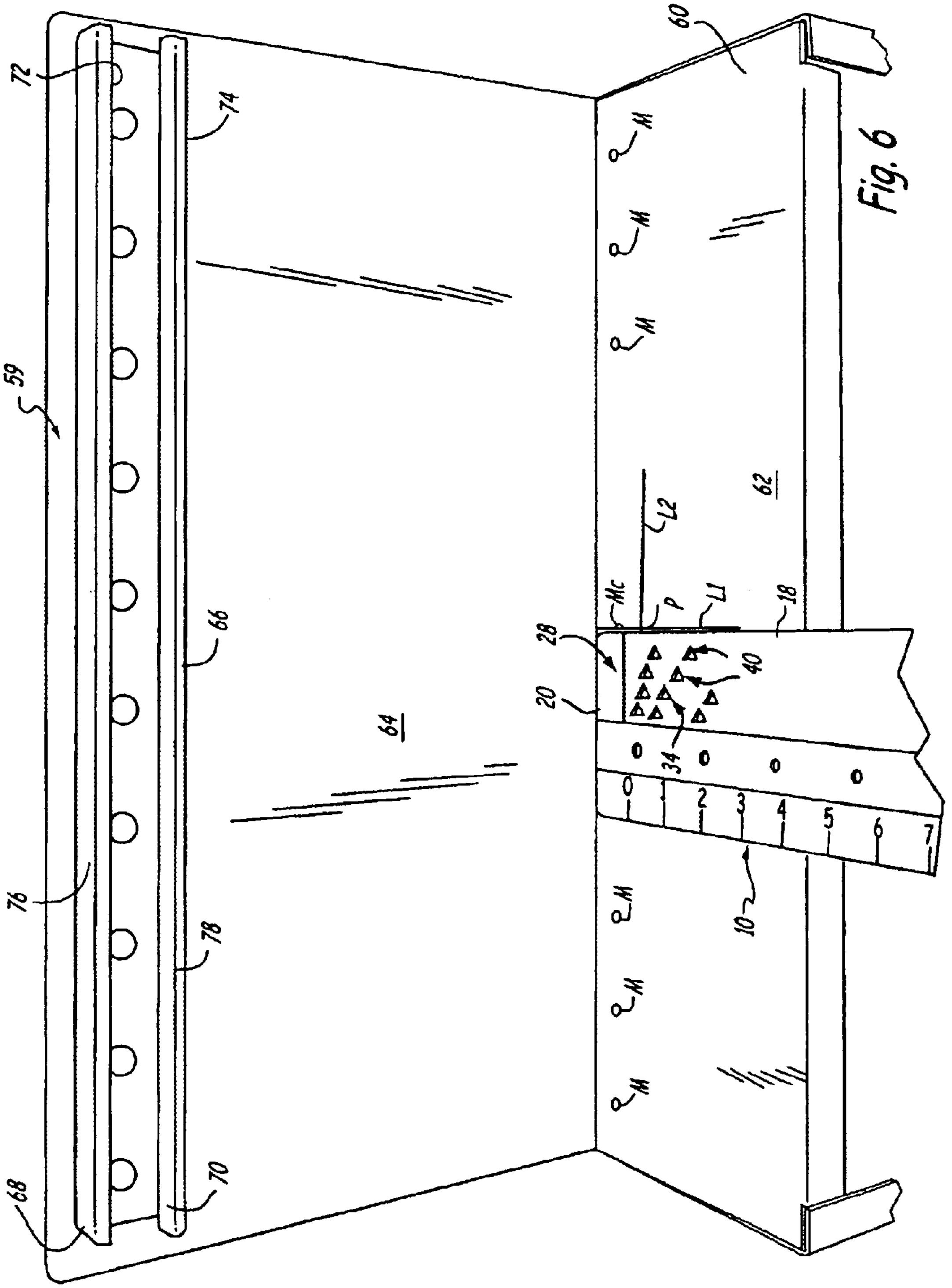
FIG. 6 is a perspective view of the electrical conduit layout template of FIG. 1 oriented transversely on the top of the electric panelboard installation of FIG. 5.

FIGS. 5 and 6 illustrate how the template is used to mark the positions of conduit entry holes onto the housing of an electric panelboard. A perspective view of a partial panelboard installation 59 is shown in FIG. 5. A panelboard 60 having a top surface 62 is mounted on wall surface 64. Strut 66 is mounted onto wall surface 64 directly above top surface 62 of panelboard 60. In the present embodiment, strut 66 has side edges 68, 70, 72, and 74 that are ¾ of an inch long, although side edges 68, 70, 72, and 74 could also each be 1½ inches long. As such, front edges 76 and 78 of strut 66 are spaced outward from wall surface 64 by a distance of approximately ¾ of an inch. Thus, any conduit secured against front edges 76 and 78 of strut 66 will be spaced approximately ¾ of an inch from wall surface 64, meaning entry holes to be cut for passage of the conduit through top surface 62 will likewise need to be spaced ¾ of an inch from wall surface 64.

FIGS. 5 and 6 are examples of how template 10 can be used to lay out seven conduit entry holes: six for ¾ inch conduit and one for 2 inch conduit. First, template 10 is placed on top surface 62 so that longitudinal straight edge 16 is positioned against wall surface 64. In this orientation, longitudinal marking zone 32 is spaced from wall surface 64 by longitudinal spacer zone 24, which in this embodiment has a width in the transverse direction of approximately ¾ of an inch. Next, a marking tool is positioned inside of each of marking apertures 38 resulting in marks M and Mc on top surface 62 of panelboard 60. Marks M correspond to the center point locations for the ¾ inch conduit entry holes. Once the entry holes associated with theses marks are either drilled or punched out, the entry holes will be spaced ¾ of an inch from wall surface 64, thereby preserving the spacing needed to connect the ¾ inch conduits to strut 66.

Because mark Mc is used in finding the location of an entry hole for 2-inch conduit, the center position for the entry hole must be distanced further from wall surface 64 then marks M. If the entry hole were formed centered on mark Mc, then the entry hole would be closer than ¾ of an inch to wall surface 64. In order to make an entry hole for 2-inch conduit spaced ¾ of an inch from wall surface 64, template 10 is repositioned so that transverse straight edge 20 is flush against wall surface 64 and longitudinal straight edge 18 dissects mark Mc. A line L1 is then marked on surface 62 along straight edge 18. Next a marking tool is placed within one of apertures 40 (corresponding to "2 inches") and the template and marking tool are dragged towards the right along wall surface 64, thereby forming a line L2. The lines L1 and L2 intersect at a point P, which is the point at which the center of a 2-inch conduit entry hole should be made. By centering the entry hole on point P, the 2 inch conduit will be space ¾ of an inch from wall surface 64.

The above example illustrates some of the ways in which the present invention is superior to the templates disclosed in the prior art. Unlike the templates disclosed in the prior art, the present template does not need to be repositioned between marking the location of each entry hole. In fact, the only time the present template needs to be repositioned is when making an entry hole sized differently then the longitudinal marking zone 32. Moreover, the spacer zones of the present invention eliminate the step of having to make an additional set of measurements to space the entry holes from the wall surface on which the panelboard is mounted.

Although the present invention has been described with reference to preferred embodiments, workers skilled in the art will recognize that changes may be made in form and detail without departing from the spirit and scope of the invention.

What is claimed is:

1. A template for laying out electrical conduit entry hole positions on an electrical panel housing, the template comprising:

a sheet having a longitudinal straight edge for engaging a wall surface on which the electrical panel housing is fixed;

a spacer zone bordered on one side by the longitudinal straight edge and extending the length of the template, wherein a width of the spacer zone in the transverse direction is either about ¾ of an inch or about 1½ inches to space conduit entry holes from the wall surface by a distance corresponding to the thickness of either ¾ inch or 1½ inch thick support means used to secure the electrical conduit to the wall surface;

a marking zone extending parallel to the longitudinal straight edge and spaced from the longitudinal straight edge by the spacer zone, the marking zone having a width in the transverse direction corresponding to an outside diameter of a given size of electrical conduit; and a plurality of apertures formed through the sheet and centered on the marking zone, wherein centers of neighboring apertures are spaced from each other by at least about 1¾ inches, the plurality of apertures forming a line parallel to the longitudinal straight edge and designed to receive a tool for marking the center locations of entry holes.

2. The template of claim 1, wherein the width of the marking zone is approximately equal to the outside diameter of ¾ inch electrical conduit.

3. The template of claim 1, wherein the plurality of apertures are spaced from one another with NECA spacing.

4. The template of claim 1, wherein the template is stamped from a metal sheet.

5. A template for laying out electrical conduit entry hole positions on an electrical panel housing, the template comprising:

a sheet having a perimeter with a pair of parallel longitudinal straight edges for engaging a wall surface on which the electrical panel is fixed;

a ¾ inch spacer zone extending the length of the template and bordered on one side by one of the longitudinal straight edges, wherein the width of the spacer zone in the transverse direction is approximately ¾ of an inch;

1½ inch spacer zone extending the length of the template and bordered on one side by the second longitudinal straight edge, wherein the width of the spacer zone in the transverse direction is approximately 1½ inches;

a longitudinal marking zone sandwiched on the sheet between the two spacer zones and oriented parallel to both longitudinal straight edges, the marking zone having a width in the transverse direction corresponding to the outside diameter of a given size of electrical conduit; and a plurality of apertures formed through the sheet and centered on the longitudinal marking zone, wherein centers of neighboring apertures are spaced from each other by at least about 1¾ , the plurality of apertures forming a line parallel to the longitudinal straight edges and designed to receive a tool for marking the center locations for electrical conduit.

6. The template of claim 5, wherein the width of the longitudinal marking zone corresponds to the outside diameter of ¾ inch electrical conduit.

7. The template of claim 5, wherein the template is stamped from a metal sheet.

8. The template of claim 5, wherein the plurality of apertures are spaced from one another with NECA spacing.

9. A method for laying out the locations of electrical conduit entry holes to be made on an electrical panel housing comprising the steps of:

providing a template comprising:

a sheet having a perimeter with a pair of parallel longitudinal straight edges for engaging a wall surface on which the electrical panel is fixed;

a ¾ inch spacer zone extending the length of the template and bordered on one side by one of the longitudinal straight edges, wherein the width of the spacer zone in the transverse direction is approximately ¾ of an inch;

a 1¾ inch spacer zone extending the length of the template and bordered on one side by the second longitudinal straight edge, wherein the width of the spacer zone in the transverse direction is approximately 1½ inches;

a longitudinal marking zone sandwiched on the sheet between the two spacer zones and oriented parallel to both longitudinal straight edges, the marking zone having a width in the transverse direction corresponding to the outside diameter of a given size of electrical conduit; and a plurality of apertures formed through the sheet and centered on the longitudinal marking zone, the plurality of apertures forming a line parallel to the longitudinal straight edges and designed to receive a tool for marking the center locations for electrical conduit, applying the template to the electrical panel housing so that the spacer zone with the width corresponding to a thickness of a support means to be used to secure the electrical conduit to the wall surface engages the wall surface;

positioning a marking tool inside the desired apertures and marking the locations of the entry holes to be made on the electrical panel housing.

10. A template for laying out the locations of electrical conduit entry holes on an electrical panel housing comprising:

a sheet having a longitudinal straight edge disposed perpendicular to a transverse straight edge, wherein both straight edges are for engaging a wall surface adjacent to the electrical panel housing;

a longitudinal spacer zone bordered on one side by the longitudinal straight edge and extending the length of the template, wherein a width of the spacer zone in the transverse direction is either about ¾ of an inch or about 1½ inches to space conduit entry holes from the wall surface by a distance corresponding to the thickness of either ¾ inch or 1½ inch thick support means used to secure the electrical conduit to the wall surface;

a transverse spacer zone bordering the transverse edge of the sheet and having a width in the longitudinal direction equal to the thickness of the support means;

a uniform marking zone extending parallel to the longitudinal straight edge and spaced from the longitudinal straight edge by the longitudinal spacer zone, the uniform marking zone having a width in the transverse direction corresponding to the outside diameter of a given size of electrical conduit and further including a plurality of longitudinal apertures formed through the sheet and centered on the uniform marking zone in a line running parallel to the longitudinal straight edge, the apertures being designed to receive a marking tool and having centers spaced from each other by at least 1¾ inches; and a graduated marking zone extending parallel to the transverse straight edge and spaced from the transverse straight edge by the transverse spacer zone, the graduated marking zone having a first set of graduated apertures formed through the sheet to receive a tool for marking the centers of entry holes, wherein the first set of apertures are variably spaced from the spacer zone to facilitate the marking of entry holes for varying sizes of conduit.

11. The template of claim 10 further including a second transverse spacer zone bordering a second transverse edge of the sheet and spacing a second graduated marking zone with a second set of graduated apertures from the second transverse edge, the second transverse spacer zone having a width in the longitudinal direction of approximately either ¾ of an inch or 1½ inches.

12. The template of claim 11, wherein both graduated marking zones overlap the same longitudinal spacer zone so that both sets of graduated apertures are located on the overlapping portions.

13. The template of claim 10 further including a second longitudinal spacer zone bordering a second longitudinal straight edge and spacing the uniform marking zone from the second longitudinal edge, the second longitudinal spacer zone having a width in the longitudinal direction of approximately either ¾ of an inch or 1½ inches.

14. The template of claim 10, wherein the template is stamped from a metal sheet.

* * * * *

UNITED STATES PATENT AND TRADEMARK OFFICE
CERTIFICATE OF CORRECTION

PATENT NO. : 6,907,674 B2
APPLICATION NO. : 10/671426
DATED : June 21, 2005
INVENTOR(S) : Mark S. Grendahl It is certified that error appears in the above-identified patent and that said Letters Patent is hereby corrected as shown below:

At Column 5, Line 56, before “1 1/2”, insert --a--

At Column 6, Line 2, after “1 3/4”, insert --inches--

At Column 6, Line 25, delete “1 3/4”, insert --1 1/2--

At Column 7, Line 12, before “1 3/4”, insert --about--

Signed and Sealed this

Twelfth Day of December, 2006

JON W. DUDAS
*Director of the United States Patent and Trademark Office*